United States Patent [19]

Ishibashi et al.

[11] 4,297,319
[45] Oct. 27, 1981

[54] APPARATUS FOR REMOVING NITROGEN OXIDES FROM FLUE GAS

[75] Inventors: Yoji Ishibashi; Yoshihiro Uchiyama, both of Hitachi; Hidetoshi Akimoto, Tokaimura; Makoto Sasaki, Morioka, all of Japan

[73] Assignee: Hitachi, Ltd., Tokyo, Japan

[21] Appl. No.: 967,052

[22] Filed: Dec. 6, 1978

[30] Foreign Application Priority Data

Dec. 7, 1977 [JP] Japan ................. 52-146021

[51] Int. Cl.³ .............. B01J 8/02; F01N 3/08; F01N 3/28
[52] U.S. Cl. .................... 422/114; 422/170; 422/171; 422/173; 422/180
[58] Field of Search .............. 422/169, 170, 171, 172, 422/173, 180, 114, 200; 423/235, 237, 239 A, 239 R

[56] References Cited

U.S. PATENT DOCUMENTS

| 4,087,250 | 5/1978 | Laue et al. | 422/171 |
| 4,102,980 | 7/1978 | Sasaki et al. | 423/239 A |
| 4,106,286 | 8/1978 | Sakai et al. | 422/173 X |
| 4,107,272 | 8/1978 | Mori et al. | 423/239 A |
| 4,160,805 | 7/1979 | Inaba et al. | 422/173 X |

Primary Examiner—Bradley Garris
Attorney, Agent, or Firm—Craig and Antonelli

[57] ABSTRACT

An apparatus for removing nitrogen oxides from a flue gas comprises a first stage of injecting ammonia in a combustion flue gas and then hydrogen peroxide thereto, thereby decomposing nitrogen oxides in the combustion flue gas to nitrogen and water by gas phase reduction, and a second stage of passing the combustion flue gas leaving the first stage through a bed of catalyst whose temperature is controlled by cooling water passing through a cooling pipe provided through the bed of catalyst, thereby conducting decomposition of excess ammonia exiting from the first stage and further reaction of nitrogen oxides at the same time.

7 Claims, 7 Drawing Figures

APPARATUS FOR REMOVING NITROGEN OXIDES FROM FLUE GAS

BACKGROUND OF THE INVENTION

This invention relates to an apparatus for removing nitrogen oxides ($NO_x$) from a combustion flue gas, and particularly to an apparatus for removing $NO_x$ by adding a reducing agent to the combustion flue gas, thereby decomposing $NO_x$ by gas phase reduction in the absence of a catalyst, and by providing a temperature-controllable bed of catalyst downstream of the stage in said apparatus where reducing agent is added to obtain a high percent $NO_x$ removal.

Combustion flue gas from various industrial combustion equipments using a fossil fuel, such as boilers and gas turbines, contains nitrogen oxides formed in the combustion process. Nitrogen oxides themselves are toxic, and are materials causing photo-chemical smogs. Accordingly a prompt development of techniques for abating $NO_x$ in the combustion flue gas has been keenly desired.

$NO_x$ is formed in a high temperature zone of a flame in the combustion equipment, and the amount of $NO_x$ formed is increased at a higher temperature and by combustion in richer oxygen.

Nowadays, the techniques of abating $NO_x$ in boilers and gas turbines are classified into two main groups, that is, the group of techniques of combustion with low $NO_x$ content and the group of techniques of removal of $NO_x$ from flue gas. The former group is based on a combustion at a low temperature in a low oxygen content, and typical processes of this type are a two-stage combustion process, a flue gas recycle process and a diluted combustion process. The latter group of techniques for removing $NO_x$ from flue gas includes a gaseous phase reduction process comprising adding hydrocarbons, hydrogen, carbon monoxide and ammonia to a combustion flue gas at a relatively high temperature to decompose $NO_x$ in a gas phase reduction, and a catalytic reduction process comprising adding ammonia, etc. to a combustion flue gas at a relatively low temperature, for example, 250° to 450° C. and decomposing $NO_x$ in the presence of a catalyst by gas phase reduction, as disclosed, for example, in U.S. Pat. No. 3,900,554.

The gas phase reduction process is new, as compared with the catalytic reduction process, and belongs to a new technical field involving various problems, but seems to be capable of being greatly advanced by the future technical development. When hydrocarbons, hydrogen and carbon monoxide or the like are used as the reducing agents in the gas phase reduction process, these reducing agents react not only with $NO_x$, but also residual oxygen in the combustion flue gas, and thus the consumption of the reducing agents is increased, rendering the process uneconomical. If ammonia is used as a reducing agent on the other hand, ammonia selectively reacts with $NO_x$ and thus the consumption of the reducing agent is small, and also the percent $NO_x$ removal is higher than that of the former process. Thus, the selective reduction process using ammonia is especially remarkable in the gas phase reduction processes.

However, according to the conventional gas phase reduction process using ammonia, the reacting temperature necessary for the $NO_x$ reduction is high, for example, at least 800° C., and when an application thereof to an existing combustion apparatus such as a boiler or gas turbine is taken into account, there are various problems due to such high temperature conditions e.g. a residence time of a high temperature gas is short, a uniform satisfactory diffusion of ammonia into the combustion flue gas is hardly attainable, etc. Especially in the case of a gas turbine, the temperature zone for removing $NO_x$ is within the turbine stage, and thus the application of such process is actually impossible. To solve these problems, a gas phase reduction process applicable to a low temperature range is now in development. As one of such processes, a gas phase reduction process comprising adding ammonia and hydrogen peroxide to a flue gas is available, and its principle of removing $NO_x$ is to decompose ammonia to active chemical species, for example, amino radical, imino radical, etc. in advance by reaction between ammonia and hydrogen peroxide and then to decompose $NO_x$ by reaction of these active chemical species by reduction. The effective temperature for $NO_x$ removal reaction can be lowered to such a low temperature range as about 400° C. in said process. In this process the necessary amount of ammonia for effectively decomposing $NO_x$ in the flue gas by reduction is in about 0.3–about 10 in terms of a molar ratio of ammonia to $NO_x$ ($NH_3/NO_x$), and preferably about 0.5–about 3 in view of the economy and prevention of unreacted ammonia discharge. The amount of hydrogen peroxide to be added thereto is that necessary for decomposing ammonia, and is about 0.3–about 1 in terms of molar ratio of hydrogen peroxide to $NO_x$ ($H_2O_2/NO_x$).

However, in this gas phase reduction process using ammonia and hydrogen peroxide, there are such disadvantages that, since oxidation of NO by hydrogen peroxide takes place, the percent $NO_x$ removal is somewhat lower than the ammonia reduction process, and when ammonia is added in excess to increase the percent $NO_x$ removal, unreacted ammonia is discharged. That is, it is difficult to obtain a satisfactory percent of $NO_x$ removal in any of the processes for removing $NO_x$ from the flue gas.

SUMMARY OF THE INVENTION

An object of the present invention is to provide an apparatus for removing $NO_x$ from a flue gas highly efficiently and economically at a flue gas temperature of 400° to 800° C., while overcoming the disadvantages of the gas phase reduction process using ammonia and hydrogen peroxide.

According to the present invention, a bed of catalyst having a cooling mechanism is provided in a combustion flue gas line at the downstream side of a gas phase reduction process stage using ammonia and hydrogen peroxide to decompose $NO_x$ by effluent unreacted ammonia leaving the preceding stage on the surface of catalyst through catalytic reduction, thereby improving the percent $NO_x$ removal and the decomposition of unreacted ammonia. That is, in a catalytic reduction reaction, reaction proceeds in a bed of catalyst and a boundary layer zone of temperature very near to that of the bed of catalyst, and thus the reaction of removing $NO_x$ can proceed by controlling the temperature of the bed of catalyst to an optimum temperature for removing $NO_x$, almost independently from the gas temperature.

The present invention is based on this principle. A satisfactory catalyst in a plate form can be prepared according to the conventional technique of shaping catalysts, and it is relatively easy to cool the catalyst in such plate form by the use of water, air, or other cooling means, thereby controlling the catalyst temperature appropriately. That is, the present invention provides an apparatus for removing $NO_x$ with a high efficiency and in a very econimical manner by applying to a flue gas having a wide temperature range of 400° to 800° C. a gas phase reduction process using ammonia and hydrogen peroxide as a first stage of removing $NO_x$, and a catalytic reduction process using the unreacted ammonia leaving the first stage and a cooled catalyst as a second stage of removing $NO_x$, and particularly provides an apparatus applicable to removal of $NO_x$ from a flue gas from a gas turbine or a combined cycle gas turbine, whose flue gas temperature is in a range of 400° to 600° C.

DESCRIPTION OF THE PREFERRED EMBODIMENTS

Figure 1:
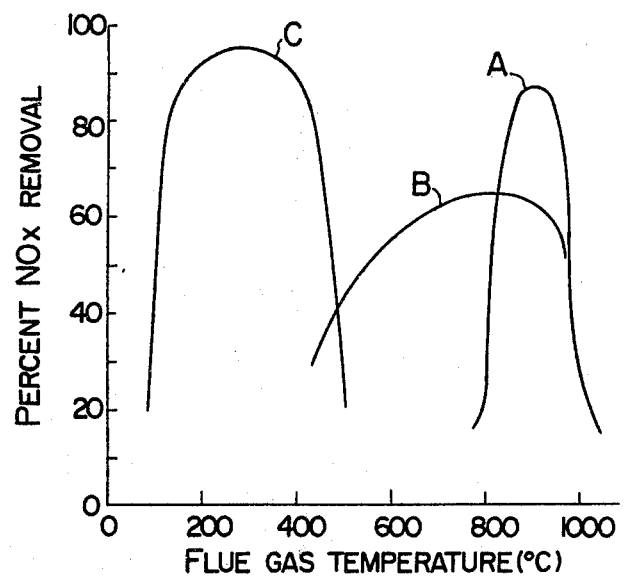
FIG. 1 is a diagram showing the $NO_x$ removal characteristics of currently available typical techniques for removing $NO_x$ from flue gas.

In FIG. 1, the $NO_x$ removal characteristics of currently available typical techniques for removing $NO_x$ from a flue gas are shown, where curve A shows the $NO_x$ removal characteristics of an ammonia gas phase reduction process for removal from a high temperature gas at least at 800° C., curve B those of an ammonia-hydrogen peroxide gas phase reduction process applied to 400°–800° C., and curve C those of an ammonia catalytic reduction process with a high percent $NO_x$ removal at 200° to 450° C. As already described in the Background of the Invention, the ammonia-hydrogen peroxide gas phase reduction process has the most practical possibility among these processes, but has not shown a satisfactory performance yet. Thus, the disadvantage of the ammonia-hydrogen peroxide gas phase reduction process can be overcome in the present invention by combining it with the ammonia catalytic reduction process.

Figure 2:
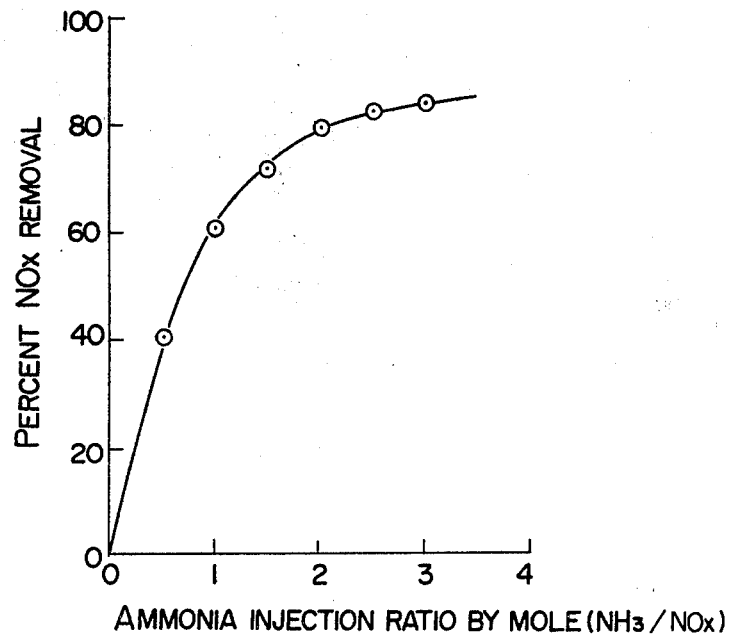
FIG. 2 is a diagram showing the $NO_x$ removal characteristics according to one embodiment of the present invention.

In FIG. 2, test results of the $NO_x$ removal by the combination of the gas phase $NO_x$ reduction with the catalytic $NO_x$ reduction aimed at in the present invention are shown. The test conditions are such that a combustion gas having a $NO_x$ concentration of 40 ppm and a gas temperature of 600° C. is passed at a flow rate of 100 $Nm^3/hr$ through a test duct filled with a bed of plate-shaped catalysts of metal oxide whose temperature can be controlled by water cooling, and $NO_x$ removal by $NO_x$ gas phase reduction is carried out at the upstream side of the catalyst bed by simultaneous injection of ammonia and hydrogen peroxide thereto as a first stage, whereas $NO_x$ removal by catalytic reduction of $NO_x$ with residual ammonia from the first stage $NO_x$ removal is carried out downstream of the first $NO_x$ removal stage in the bed of the catalyst kept to about 400° C. by water cooling as a second stage, where the amount of hydrogen peroxide injected is 0.75 times the moles of $NO_x$, and the space velocity through the bed of the catalyst (gas volumetric flow rate/catalyst bed volume) is 26,000 $hr^{-1}$.

Figure 3:
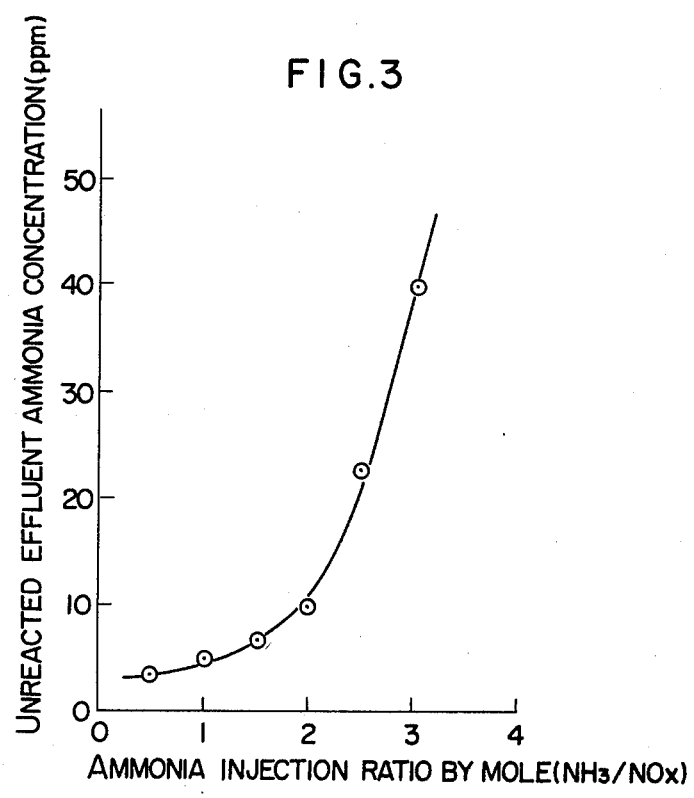
FIG. 3 is a diagram showing the unreacted effluent ammonia concentration change under the same conditions as shown in FIG. 2.

In FIG. 3, results of measuring concentrations of unreacted effluent ammonia under the same test conditions as in FIG. 2 are shown.

From the test results of FIGS. 2 and 3, it is evident that the necessary amount of catalyst can be reduced to about one-half of the amount required in the conventional $NO_x$ removal by catalytic reduction and at the same time the amount of effluent ammonia can be controlled to a low concentration as the effects of the combination of the $NO_x$ removal processes and also of the first stage $NO_x$ removal by gas phase reduction.

Figure 4:
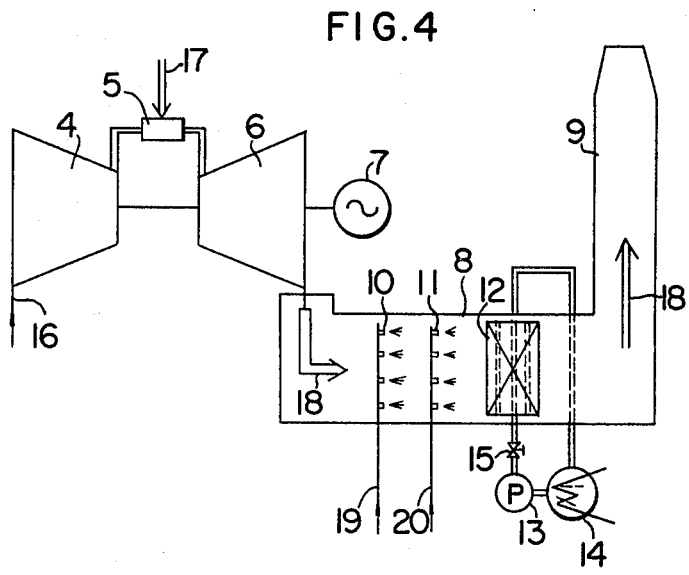
FIG. 4 is a schematic view of one embodiment of applying the present apparatus to a gas turbine to remove $NO_x$ from a flue gas.

In FIG. 4, an embodiment of applying the present invention to a gas turbine for power generation is shown. The ordinary gas turbine comprises an air compressor 4, a combustor 5, a turbine 6, a generator 7, a flue gas duct 8, and a stack 9. Air 16 is taken into the air compressor 4, compressed, mixed with a fuel gas 17 at the combustor 5, combusted, and expanded in the turbine to drive the generator 7 and the compressor 4, and combustion flue gas is discharged into the duct 8. Temperature of combustion flue gas after having worked in the turbine is about 450° to about 600° C., and an oxygen partial pressure is 14–16% with a $NO_x$ concentration being 100–200 ppm. The flue gas leaving the turbine is discharged as a combustion flue gas 18 to the atmosphere from the stack 9 through the duct 8, but the gas temperature is hardly lowered in the duct due to a large volume of gas. By adding ammonia 19 and hydrogen peroxide 20 to the flue gas from an ammonia nozzle 10 and a hydrogen peroxide nozzle 11, respectively, $NO_x$ is decomposed by gas phase reduction. A bed of catalyst 12 provided with a cooling mechanism according to the present invention is installed at the downstream side in the duct to conduct $NO_x$ removal by catalytic reduction of $NO_x$ with unreacted ammonia. In the present embodiment, a temperature control by water cooling is shown, where a cooling water system is a closed circuit provided with a cooler 14. Cooling water is pumped through the bed 12 of the catalyst by a pump 13 to cool the catalyst, and the resulting hot water is again cooled in the cooler 14. In such an apparatus for removing $NO_x$, ammonia is added thereto a little in excess, for example, at a molar ratio of $NH_3$ to $NO_x$ of 1–3 moles, and hydrogen peroxide is added thereto at a molar ratio of $H_2O_2$ to $NO_x$ of about 0.3–about 1, which gives a good $NO_x$ removal performance.

The catalytic reduction reaction satisfactorily proceeds with unreacted effluent ammonia from the preceding stage of gas phase reduction process by controlling the temperature of the catalyst of metal oxide system to about 300°–about 450° C., while the flue gas temperature is kept unchanged at about 450°–about 600° C. Furthermore, the decomposition reaction of unreacted ammonia also proceeds together with the $NO_x$ removal reaction.

Furthermore, since the decrease in the gas temperature is not so large through the bed of catalyst according to the present invention, the flue gas duct 8 of the gas turbine can be applied preferably as an apparatus for $NO_x$ removal of flue gas from a combined cycle gas turbine by providing a waste heat boiler in the flue gas duct 8.

Figure 5:
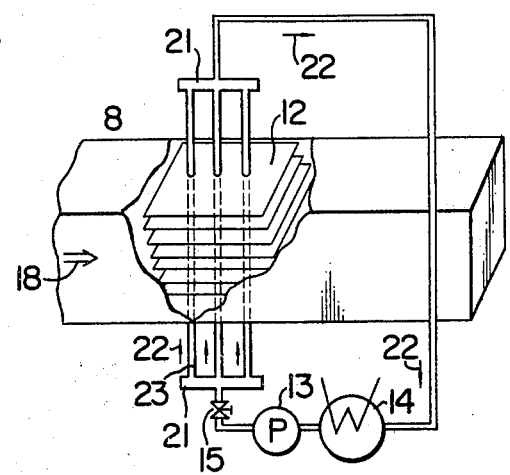
FIG. 5 is a partial structural view of FIG. 4, showing a catalyst temperature control by water cooling.

FIG. 5 relates to the embodiment shown in FIG. 4, and more specifically shows the water cooling device for the catalysts. The catalysts in the bed 12 is formed in plates, the plates are arranged in parallel to one another through a plurality of cooling water pipes 23 to provide a catalyst bed structure of the so called parallel flow type. Such structure can reduce a pressure drop through the catalyst bed and thus is suitable for gas turbines with a high flue gas velocity.

Figure 6:
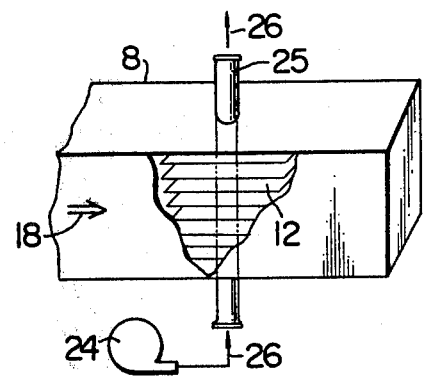
FIGS. 6 and 7 are partial structural views of FIG. 4, showing a catalyst temperature control by air cooling.
Figure 7:
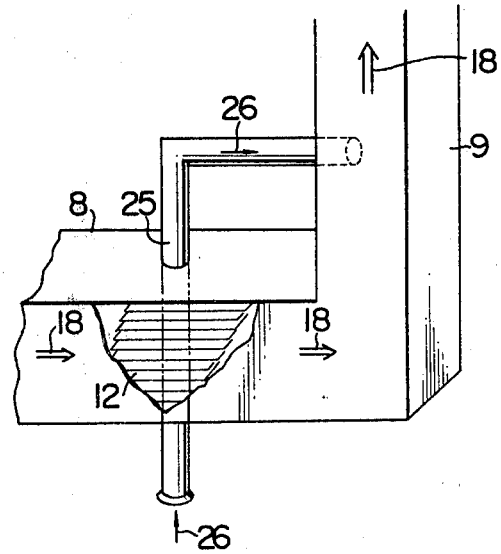

In FIG. 6, catalyst plates in the bed 12 are closely fixed to an air pipe 25 passing through the flue gas duct 8, and cooling air is supplied to the air pipe 25 by a blower 24 to control the catalyst temperature. Such catalyst bed structure can control the catalyst temperature by adjusting a cooling air rate through the air pipe. In FIG. 7, the catalyst temperature is controlled by air cooling in the similar manner to that shown in FIG. 6. An air pipe 25 is passed through a flue gas duct 8, and one end of the air pipe 25 is open to the atmosphere, and the other end thereof is open to the inside of stack 9. Catalyst plates of the bed 12 are closely fixed to the air pipe 25 within the flue gas duct 8. In such a structure, an air flow 26 is induced through the air pipe 25 by natural ventilation and suction, made by the stack, and the plates are cooled by the air flow. In the present embodiment, power is not required for air cooling, rendering the operation economical.

The present invention is applicable not only to $NO_x$ removal from flue gas from a gas turbine, but also to boilers, a heating furnace, etc. so long as the flue gas temperature is about 400°–about 850° C.

Effects of the present apparatus for $NO_x$ removal from a flue gas as described above will be summarized below:

By providing a bed of a catalyst of a metallic oxide system, provided with a temperature cooling mechanism downstream of an ammonia-hydrogen peroxide gas phase reduction process, (1) decomposition of effluent excess ammonia from the ammonia-hydrogen peroxide gas phase reduction process is promoted. (2) Since the gas phase reduction and the catalytic reduction proceed at the same time, the $NO_x$ removal process with a high efficiency (high percent $NO_x$ removal and low pressure drop) can be obtained. (3) Since the $NO_x$ removal by catalytic reduction proceeds almost independently from the flue gas temperature, it is possible to effectively conduct the $NO_x$ removal reaction for a flue gas at a relatively high temperature such as a flue gas temperature of 400°–850° C. Particularly, the present invention can be preferably applied to a gas turbine whose flue gas temperature is about 450°–about 600° C., and can provide a compact and highly efficient plant for $NO_x$ removal.

What is claimed is:

1. An apparatus for removing nitrogen oxides from a combustion flue gas, which comprises a flue gas duct for passing a combustion flue gas containing nitrogen oxides therethrough, means for adding ammonia and hydrogen peroxide into the flue gas passing through the flue gas duct, thereby reducing the nitrogen oxides in the flue gas in a gas phase, catalyst means comprised of a metallic oxide system for further reducing the remainder of nitrogen oxides, by directly contacting the flue gas, provided in the flue gas duct downstream of said means for adding ammonia and hydrogen peroxide to the flue gas duct and cooling means for cooling the catalyst means being provided within the catalyst means; the means for adding ammonia and hydrogen peroxide into the flue gas comprising one injector means for the ammonia and another injector means for the hydrogen peroxide.

2. An apparatus according to claim 1, wherein a temperature controlling means is provided for controlling the temperature of the catalyst means, said controlling means being located in the cooling means.

3. An apparatus according to claim 1, wherein the catalyst means is a bed of metallic oxide catalysts formed in the shape of plates and positioned in a parallel layer arrangement through which a water cooling pipe is passed, whereby the catalyst bed temperature is controlled by cooling water passing through the water cooling pipe.

4. An apparatus according to claim 1, wherein the catalyst means is a bed of catalysts of metallic oxide formed in the shape of plates and secured to an air pipe that passes through the bed located in the flue gas duct, and means for passing air through the air pipe, thereby cooling the air pipe and controlling the catalyst bed temperature.

5. An apparatus for removing nitrogen oxides from a combustion flue gas which comprises a flue gas duct for passing a combustion flue gas containing nitrogen oxides therethrough, one means for adding ammonia and another means for adding hydrogen peroxide into one zone of the flue gas duct through which the flue gas passes to thereby reduce the nitrogen oxides contained in the flue gas in a gas phase and a catalyst bed means containing catalyst of a metal oxide system for further reducing the nitrogen oxides remaining in said combustion flue gas, said catalyst bed being located downstream of said means for adding ammonia and hydrogen peroxide to said flue gas duct and being provided with means for cooling the catalyst contained therein.

6. An apparatus according to claim 5, wherein the catalyst bed means comprises a plurality of metallic oxide catalysts in the form of plates arranged parallel to the flow of gas through said flue gas duct and said cooling means includes a conduit extending through said plates transversely to the flow of combustion flue gas passing through said flue gas duct and means for passing a cooling fluid through said conduit.

7. An apparatus for removing nitrogen oxides from a combustion flue gas which comprises a flue gas duct for passing a combustion flue gas containing nitrogen oxides therethrough, means for adding ammonia and hydrogen peroxide to the combustion flue gas passing through said flue gas duct thereby reducing the nitrogen oxides contained in the flue gas in a gas phase, said means including a first injection device for adding ammonia and a second injection device for adding hydrogen peroxide, said second injection device being located downstream of the first injection device, and a catalyst bed of catalyst of a metallic oxide system for further reducing the nitrogen oxides by directly contacting the nitrogen oxides in the flue gas being located in the flue gas duct downstream of the means for adding ammonia and hydrogen peroxide to the flue gas duct, said catalyst bed including means for cooling the catalyst bed and said catalyst bed including a plurality of metallic oxide catalyst plates arranged in parallel to the gas flow of the combustion gas passing through the flue gas duct and said means for cooling the catalyst bed including a conduit extending through said plates and means for passing a cooling fluid through said conduit.

* * * * *